United States Patent
Costa et al.

(10) Patent No.: US 10,501,895 B2
(45) Date of Patent: Dec. 10, 2019

(54) CONCRETE SLAB JOINT STABILIZER

(71) Applicant: Illinois Tool Works Inc., Glenview, IL (US)

(72) Inventors: Robert P. Costa, Norfolk, VA (US); George E. Garber, Lexington, KY (US); D. Michael McPhee, Charlotte, NC (US); Phillip J. Quenzi, Atlantic Mine, MI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 16/045,234

(22) Filed: Jul. 25, 2018

(65) Prior Publication Data

US 2019/0040590 A1   Feb. 7, 2019

Related U.S. Application Data

(60) Provisional application No. 62/539,827, filed on Aug. 1, 2017.

(51) Int. Cl.
| | | |
|---|---|---|
| *E01C 11/00* | (2006.01) | |
| *E01C 11/14* | (2006.01) | |
| *E01C 7/14* | (2006.01) | |
| *E01C 11/04* | (2006.01) | |
| *F16B 13/08* | (2006.01) | |
| *E01C 5/00* | (2006.01) | |
| *E04B 1/48* | (2006.01) | |

(52) U.S. Cl.
CPC .............. *E01C 11/14* (2013.01); *E01C 5/005* (2013.01); *E01C 7/147* (2013.01); *E01C 11/04* (2013.01); *F16B 13/0841* (2013.01); *E04B 1/48* (2013.01)

(58) Field of Classification Search
CPC ................................ E01C 11/14; E01C 7/147
USPC ...................................................... 404/46–72
See application file for complete search history.

(56) References Cited

U.S. PATENT DOCUMENTS

| | | | |
|---|---|---|---|
| 2,194,383 A | | 3/1940 | Clark |
| 3,618,992 A | * | 11/1971 | Whistler, Sr. ........... F16B 13/00 403/11 |
| 3,694,012 A | | 9/1972 | Gelfand |
| 4,453,360 A | | 6/1984 | Barenberg |
| 4,469,465 A | | 9/1984 | Andrus |
| 4,764,071 A | | 8/1988 | Lawrence et al. |
| 6,052,964 A | | 4/2000 | Ferm et al. |

(Continued)

FOREIGN PATENT DOCUMENTS

BE    519317    4/1955

OTHER PUBLICATIONS

International Search Report and Written Opinion from International Application No. PCT/US2018/043840, dated Oct. 31, 2018 (14 pages).

*Primary Examiner* — Raymond W Addie
(74) *Attorney, Agent, or Firm* — Neal, Gerber & Eisenberg LLP (57) ABSTRACT

A concrete slab joint stabilizer including an expandable housing including a cylinder defining a slit running along its longitudinal length, the expandable housing having a housing axis extending longitudinally there through, and an expander configured to expand the expandable housing in directions perpendicular to the housing axis. The concrete slab joint stabilizer is configured to limit relative vertical displacement between two adjacent concrete slabs.

23 Claims, 8 Drawing Sheets

(56) References Cited

U.S. PATENT DOCUMENTS

| | | |
|---|---|---|
| 6,532,714 B1 | 3/2003 | Ferm et al. |
| 7,334,963 B2 | 2/2008 | Costa et al. |
| 9,476,165 B2 * | 10/2016 | Schenk .................. E01C 11/14 |
| 2003/0017024 A1 | 1/2003 | Bisping et al. |

* cited by examiner

CONCRETE SLAB JOINT STABILIZER

PRIORITY

This application claims priority to and the benefit of U.S. Provisional Patent Application Ser. No. 62/539,827, filed Aug. 1, 2017, the entire contents of which are incorporated herein by reference.

FIELD

The present disclosure relates to restoration of load transfer capacity in concrete slabs, and particularly restoration of load transfer capacity in horizontally adjacent concrete slabs.

BACKGROUND

Concrete floors typically include a series of separate individually poured or cast-in-place adjacent concrete slabs. Concrete floors can also be made up of concrete slabs that are formed from larger concrete slabs that are individually poured or cast-in-place. Such concrete slabs that are formed from such larger concrete slabs are often made by employing or forming one or more contraction joints in the larger concrete slabs. Contraction joints (which are also sometimes called control joints) are used to control naturally or randomly occurring cracking in concrete floors from stresses caused by concrete shrinkage, thermal contraction, moisture or thermal gradients within the concrete, and/or various external forces on the concrete floors. Contraction joints are typically formed by vertically cutting the concrete floors along or at the area of the desired location of the contraction joint. Contraction joints are typically vertically sawed into the concrete and often extend approximately one third of the way through the depth of the concrete. When larger concrete slab cracks along the contraction joint, the smaller adjacent concrete slabs are formed.

It should be appreciated that the term concrete slab as used herein is meant to include a separately individually poured or cast-in-place concrete slab or a concrete slab formed from a larger concrete slab.

U.S. Pat. No. 7,334,963 discloses a joint stabilizing apparatus having an expandable cylindrical housing that can be inserted into a cylindrical hole drilled at a "loose joint" at or between two adjacent concrete slabs. This joint stabilizing apparatus limits relative vertical displacement between the two adjacent concrete slabs. More specifically, the hole is drilled downward into the concrete, centered on the plane of a lateral opening/joint at or between the adjacent concrete slabs. This expandable cylindrical housing includes two rigid semi-circular housing halves. This joint stabilizing apparatus is oriented inside of the circular hole such that the two housing halves are on opposite sides of the centerline of the lateral opening/joint. The housing halves are pushed apart by turning a threaded bolt inside of the housing. Turning the bolt causes two bi-laterally symmetric wedge blocks to draw towards each other, and pressing the bearing surfaces of the wedge blocks against inclined surfaces inside of the respective housing halves. As the housing halves are pushed apart, the outside surfaces of the expandable housing engage the adjacent walls of the adjacent concrete slabs formed by the drilled hole and apply opposing horizontal compressive forces to the adjacent concrete slabs. Friction between the expandable housing and the adjacent concrete slabs limits or prevents the adjacent concrete slabs from vertically moving relative to each other.

The apparatus disclosed in U.S. Pat. No. 7,334,963 has multiple moving parts that typically require the apparatus to have a certain size and outer diameter, which in turn requires a similarly-sized hole to be drilled in the adjacent concrete slabs. There is a need to improve the joint stabilizing apparatus disclosed in U.S. Pat. No. 7,334,963 by making it simpler and by providing an option for an apparatus with a smaller size outer diameter.

SUMMARY

Various embodiments of the present disclosure provide an improved joint stabilizer that addresses the above problems.

Various embodiments of the present disclosure provide a joint stabilizer including: (a) an expandable housing including a cylinder with a slit or slot running along its entire longitudinal length, the expandable housing having a housing axis extending longitudinally there through; and (b) an expander partly positionable in the expandable housing and configured to expand the expandable housing in directions perpendicular to the housing axis. This configuration enables the joint stabilizer to be inserted into a circular hole drilled at a "loose joint" at or between two adjacent concrete slabs. This joint stabilizer limits relative vertical displacement between the two adjacent concrete slabs.

Other objects, features, and advantages of the present disclosure will be apparent from the following detailed disclosure, taken in conjunction with the accompanying sheets of drawings, wherein like reference numerals refer to like parts.

DETAILED DESCRIPTION

While the apparatus and methods described herein may be embodied in various forms, the drawings show and the specification describes certain exemplary and non-limiting embodiments. Not all of the components shown in the drawings and described in the specification may be required, and certain implementations may include additional, different, or fewer components. Variations in the arrangement and type of the components; the shapes, sizes, and materials of the components; and the manners of connections of the components may be made without departing from the spirit or scope of the claims. Unless otherwise indicated, any directions referred to in the specification reflect the orientations of the components shown in the corresponding drawings and do not limit the scope of the present disclosure. Further, terms that refer to mounting methods, such as mounted, connected, etc., are not intended to be limited to direct mounting methods but should be interpreted broadly to include indirect and operably mounted, connected and like mounting methods. This specification is intended to be taken as a whole and interpreted in accordance with the principles of the present disclosure and as understood by one of ordinary skill in the art.

Figure 4:
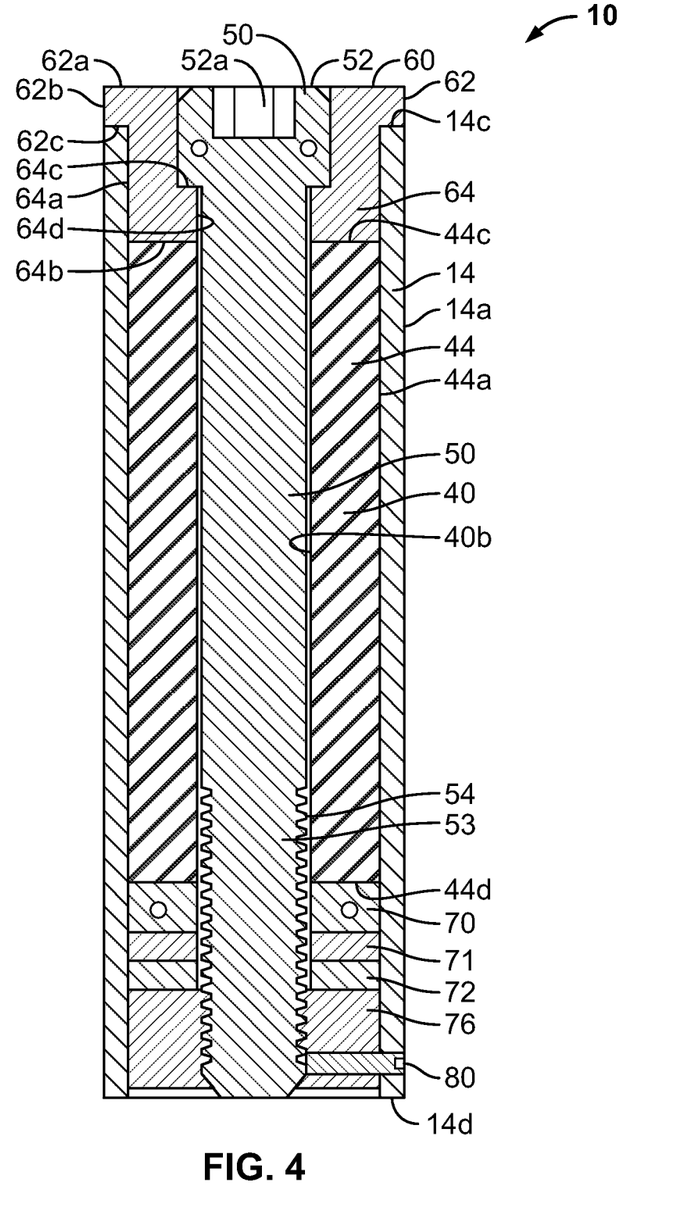
FIG. 4 is a diagrammatic sectional view of the joint stabilizer of FIG. 1.
Figure 4A:
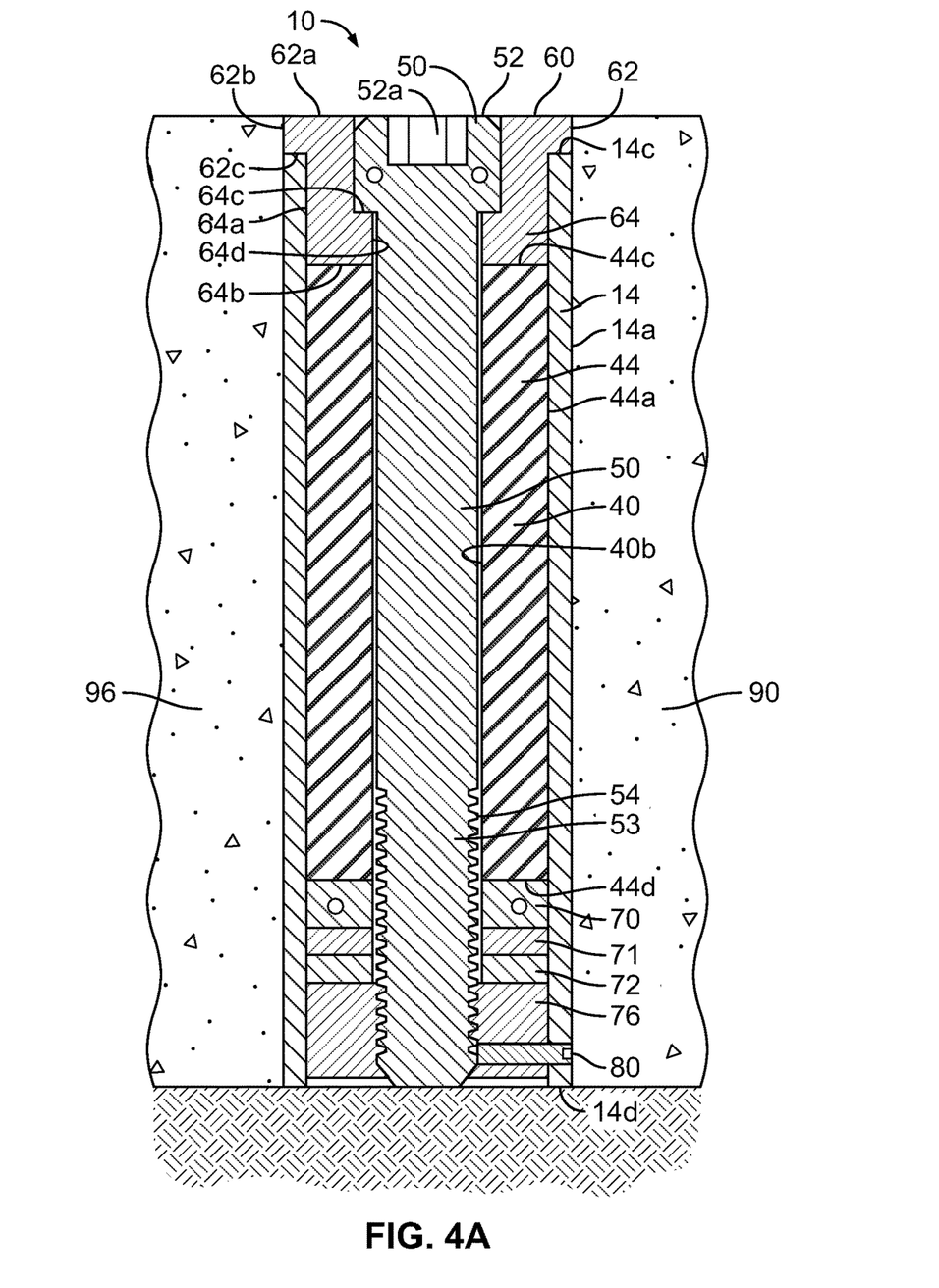
FIG. 4A is a diagrammatic sectional view of the joint stabilizer of FIG. 1 positioned between two adjacent concrete slabs.
Figure 5:
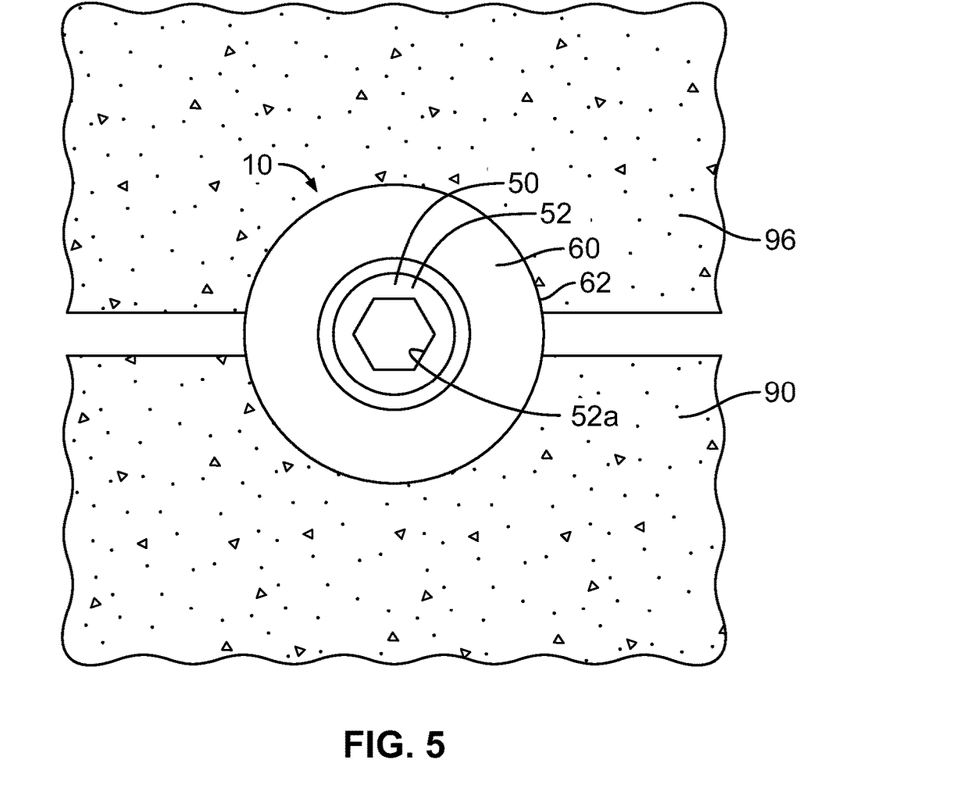
FIG. 5 is a top view of the joint stabilizer of FIG. 1 positioned between two adjacent concrete slabs.

Referring now to the Figures, and particularly to FIGS. 1 to 5, one example embodiment of the joint stabilizer of the present disclosure is illustrated and indicated by numeral 10. This example illustrated joint stabilizer is configured to be inserted into a cylindrical hole drilled at a "loose joint" at or between two adjacent concrete slabs 90 and 96 (such as shown in FIGS. 4A and 5) to stabilize the adjacent concrete slabs 90 and 96 against relative vertical displacement between the adjacent concrete slabs 90 and 96 and thus relative to each other. It should be appreciated that the present disclosure contemplates that multiple joint stabilizers 10 will be employed at spaced apart locations between two adjacent concrete slabs (such as concrete slabs 90 and 96) to stabilize the adjacent concrete slabs against such relative vertical movement.

This illustrated example joint stabilizer 10 generally includes an expandable housing 12 and an expander 30 partially positionable within the expandable housing 12.

The expandable housing 12 in this illustrated example embodiment includes an elongated tubular cylinder wall 14 defining: (1) an interior elongated central opening (not labeled) running along its entire longitudinal length; and (2) a slit or slot 18 running along its entire longitudinal length. The tubular cylinder wall 14 includes an outer surface 14a, an inner surface wall 14b, a first or upper end surface 14c, and a second or lower end surface 14d. The tubular cylinder wall 14 also includes two opposing edges 14e and 14f that define the slit or slot 18. In this illustrated example embodiment, the elongated slit or slot 18 has a wider portion at the second or lower end portion of the tubular cylinder wall 14. The expandable housing 12 has a longitudinal housing axis (not labeled) extending longitudinally there through. The expandable housing 12 can be made out of any suitable material, including, but not limited to, stainless steel or aluminum, in accordance with the present disclosure. The expandable housing can be alternatively sized and configured in accordance with the present disclosure.

Figure 1:
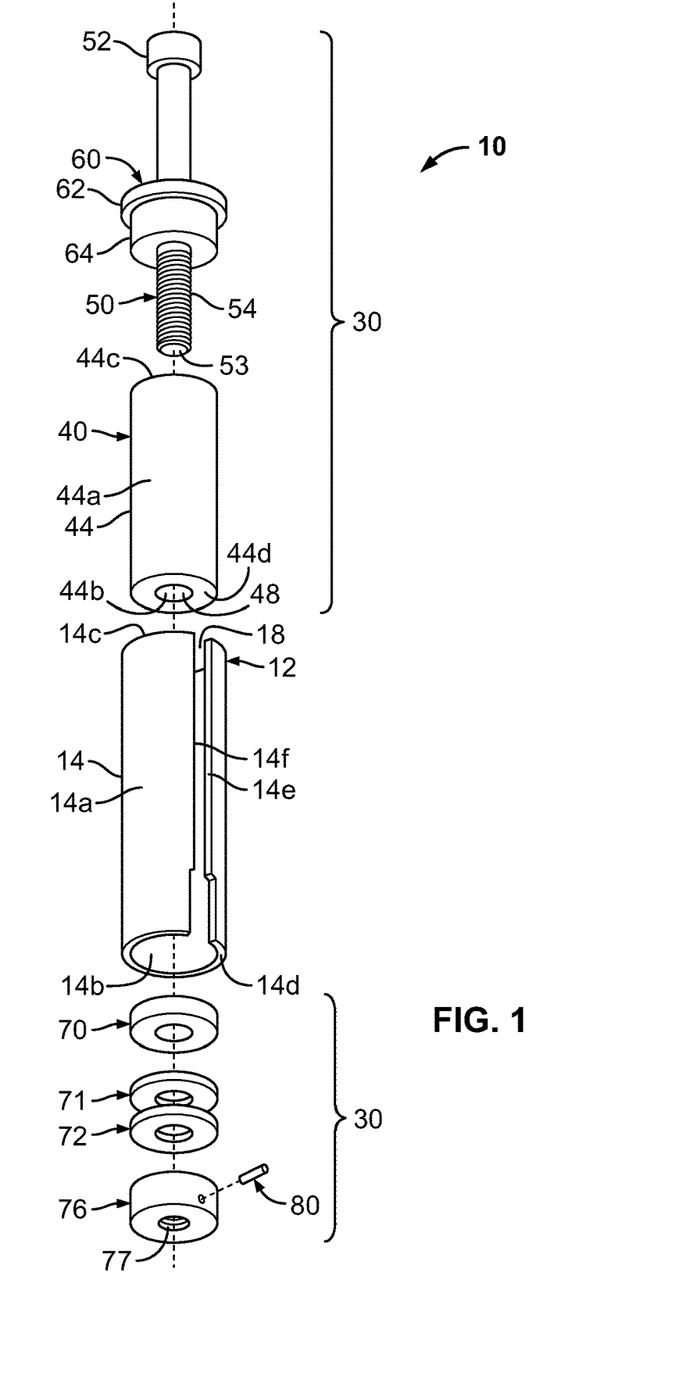
FIG. 1 is an exploded perspective view of the joint stabilizer of one example embodiment of the present disclosure.
Figure 2A:
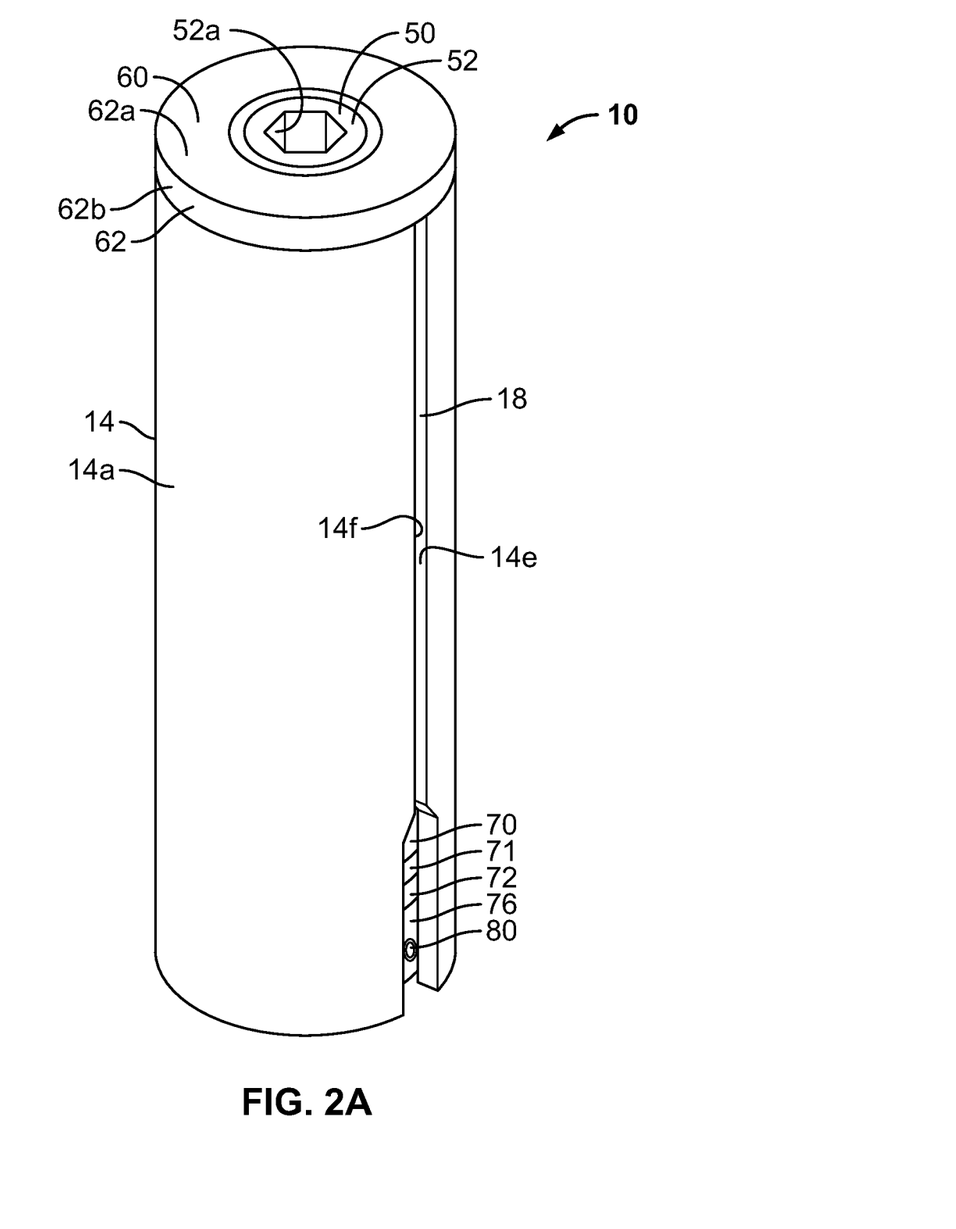
FIG. 2A is an perspective view of the joint stabilizer of FIG. 1.
Figure 2B:
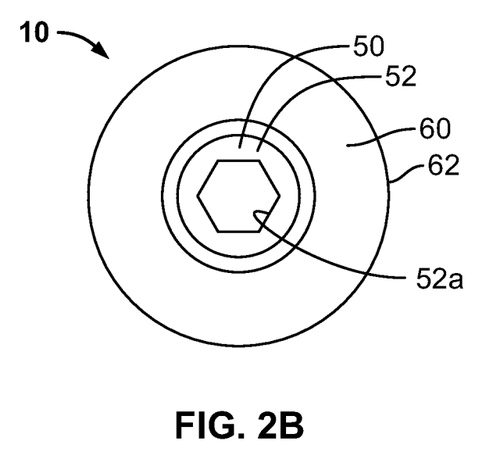
FIG. 2B is an end view of the joint stabilizer of FIG. 1.
Figure 2C:
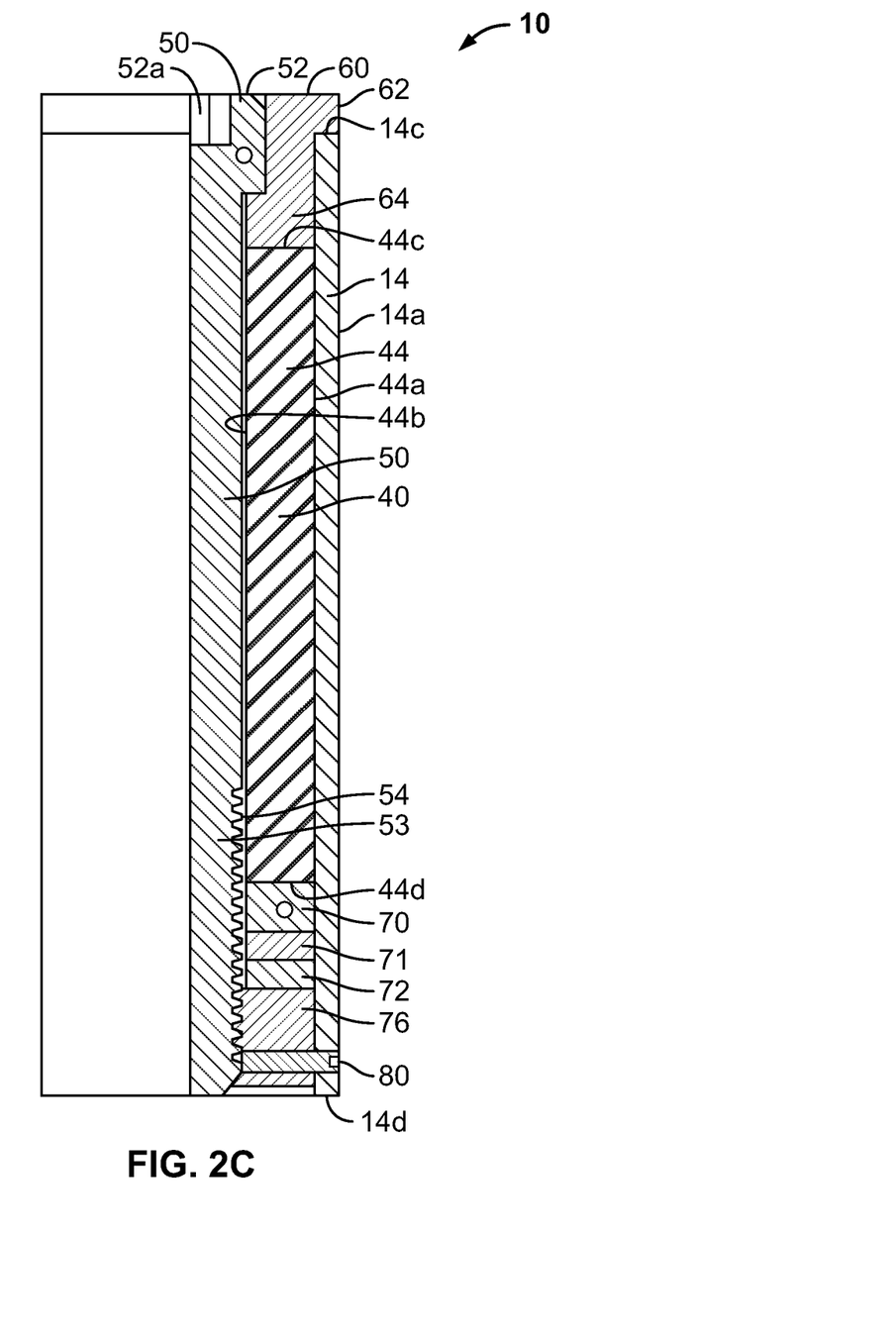
FIG. 2C is a partial cross sectional view of the joint stabilizer of FIG. 1.
Figure 3:
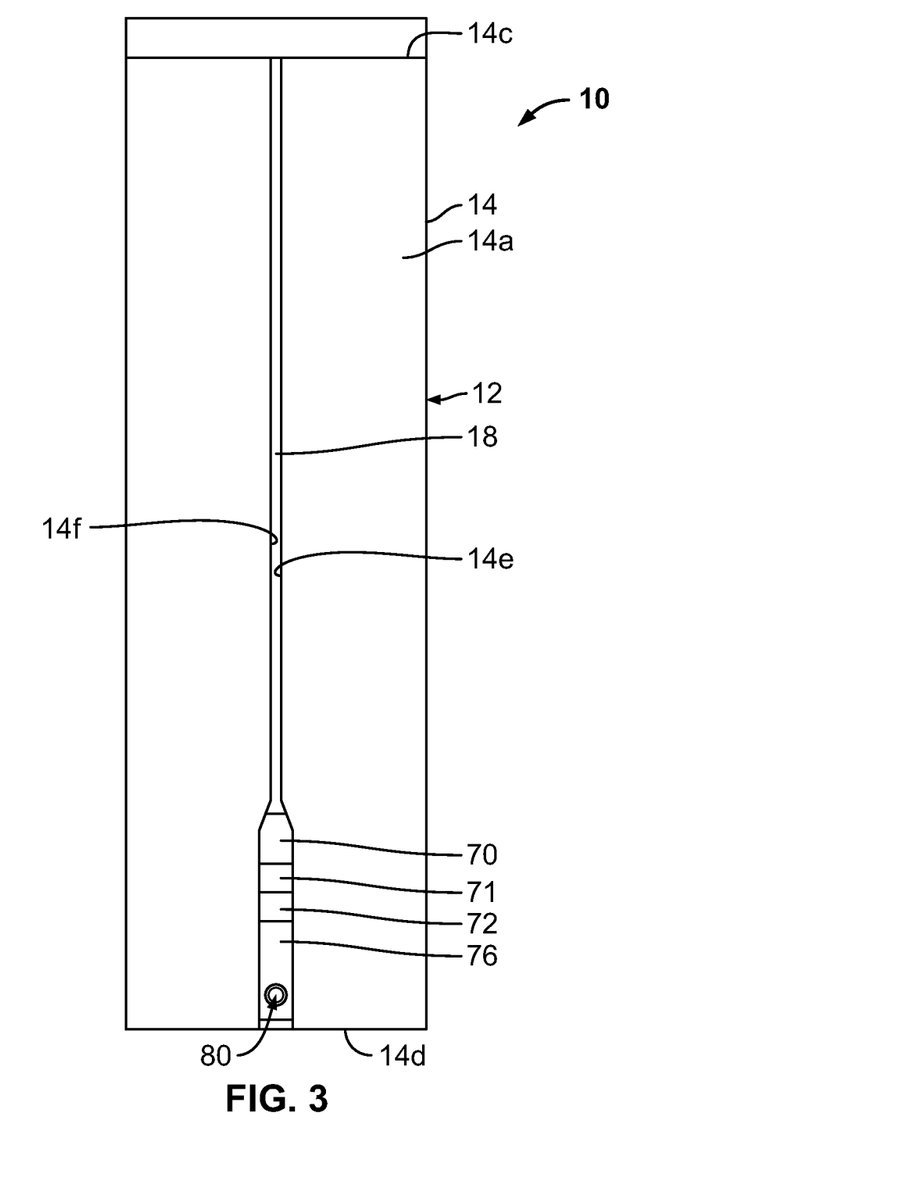
FIG. 3 is a diagrammatic exterior view of the joint stabilizer of FIG. 1.

The expander 30 is configured to be positioned mostly inside the expandable housing 12 and configured to expand the expandable housing 12 in directions transverse and particularly perpendicular to the longitudinal housing axis. In this illustrated example embodiment, the expander 30 includes a compressible tube 40, a bolt 50, a machined cap 60, washers 70, 71, and 72, a nut 76, and a pin 80.

The cylindrical compressible tube 40 in this illustrated example embodiment includes a relatively thick elongated tubular cylinder wall 44 defining a central opening 48 running along its entire longitudinal length. The tubular cylinder wall 44 of the compressible tube 40 includes an outer surface 44a, an inner surface 44b that defines the central opening 48, a first or upper end surface 44c, and a second or lower end surface 44d. The compressible tube 40 has a longitudinal compressible tube 40 axis (not labeled) extending longitudinally there through.

The cylindrical compressible tube 40 can be made of any suitable material, including, but not limited to being a treated rubber tube. In one example embodiment, the rubber compressible tube 40 has a shore durometer hardness of 10 or greater as measured on the D scale. The type of material used for the compressible tube 40, including, but not limited to, the type of rubber, may be determined based on the application of the joint stabilizer 10 where factors such as salt water corrosion or extreme changes in temperature should be considered. In another example embodiment, the compressible tube 40 is in the form of a rubber spacer such as a spacer typically used in engine block mounts. In another example embodiment, the compressible tube 40 is made from recycled tires such as fiberglass or other reinforced tires. In various such embodiments, the compressible tube 40 is made from multiple circular sections each made, cut, or stamped from one or more tires.

In this illustrated example embodiment, the expander 30 includes a machined cap 60. The machined cap 60 is configured to engage the first or upper end of the housing 12, engage the first or upper end of the compressible tube 40, receive the head 52 of the bolt 50, be engaged by the bottom end of the head 52 of the bolt 50, compress tube 40, and enable the bolt 50 to rotate within the expandable housing 12. The machined cap 60 includes a first or upper member 62 and a second or lower member 64 integrally connected to the first or upper member 62 and extending therefrom. In this illustrated example embodiment, the upper member 62 is generally cylindrical and has a wider outer diameter than the lower member 64. The upper member 62 includes a top surface 62a, a bottom surface 62c, an outer surface 62b extending between the top surface 62a and the bottom surface 62c, and an inner surface 62d extending between the top surface 62a and the bottom surface 62c. The bottom surface 62c is configured to engage the upper surface 14c of the wall 14 of the expandable housing 12 when the housing 12 is in non-expanded or resting position. The inner surface 62d is configured to be adjacent to or engaged by the outer surface of the head 52 of the bolt 50. The lower member 64 includes a top area (not labeled), a bottom surface 64b, an outer surface 64a extending between the top area and the bottom surface 64b, and an inner surface 64d extending between the top area and the bottom surface 64b. The bottom surface 64b is configured to engage the upper surface 44c of the wall 44 of the compressible tube 40 when the compressible tube 40 is in either the decompressed (i.e., non-compressed) or compressed positions. The lower member 64 also includes an annular inner cylindrical shelf (not labeled) that extends inwardly and is configured to be engaged by the bottom surface of the head 52 of the bolt 50 to maintain the cap 60 in position against and relative to the tube 40 and the housing 12. The cap can be alternatively sized and configured in accordance with the present disclosure.

The bolt 50 is insertable through the compressible tube 40 and specifically through the central opening 48. The bolt 50 has a first end portion having a head 52 configured to be turned. The bolt 50 has a second end portion or shank 53 that is threaded or that has suitable threads 54. The head 52 includes an interior mechanical engaging structure 52a. The mechanical engaging structure 52a is engageable by a suitable tool (not shown) to rotate the bolt 50. In this illustrated example embodiment of the present disclosure, the mechanical engaging structure 52a includes a plurality of internal walls (not labeled) having a plurality of first surfaces (not labeled) that define a hexagonal shaped slot or receiving formation configured to receive a hex head of or attached to a rotating tool such that the hex head can engage these respective first surfaces that define the hexagonal shaped slot. It should be appreciated that in other embodiments of the present disclosure, other mechanical engaging structures may be employed as the mechanical engaging structure of the head of the bolt in accordance with the present disclosure.

In this illustrated example embodiment, the expander 30 includes a plurality of washers 70, 71, and 72 between the nut 76 and the compressible tube 40. The plurality of washers 70, 71, and 72 may include one or more Bellville washers or other suitable washers. In other embodiments of the present disclosure, the quantity of washers may vary. The washers 70, 71, and 72 are configured to be inserted through an opening (not labeled) in the bottom portion of the expandable housing 12 during assembly. The washers 70, 71, and 72, and particularly washer 70 is configured to engage the lower or second end surface 44d of the wall 44 of the tube 40.

The nut 76 is configured to be inserted through an opening (not labeled) in the lower portion of the expandable housing 12 during assembly. The nut 76 is configured to be screwed onto the bolt 50. More specifically, the nut 76 has inner threads 77 that are engagable with the outer threads 54 (and thus the threaded second end portion 53) of the bolt 50 (by rotation of the bolt 50). The nut 76 is rotatably fixed relative to the expandable housing 12, thereby preventing the nut 76 from rotating within the expandable housing 12 while letting or enabling the nut 76 to move or slide longitudinally within the expandable housing 12. In this illustrated example embodiment, the nut 76 is rotatably fixed relative to the expandable housing 12 via the pin 80 that is transversely inserted in, connected to, and that extends transversely from the exterior of the nut 76 through the slot 18 of the wall 14 of the housing 12. The edges 14e and 14f of the wall 14 of the housing 12 prevent rotation of the pin 80 and thus the nut 76. This configuration maintains the coupling of the various components of the joint stabilizer 10. It should be appreciated that in alternative embodiments, one or more of the washers can be configured to additionally engage the wall 14 of the housing 12 (such as in an interior notch in the housing 12) to further maintain the coupling of the various components of the joint stabilizer 10. It should further be appreciated that in alternative embodiments, other suitable components can be employed to maintain the coupling of the various components of the joint stabilizer 10.

In this illustrated example embodiment, turning the bolt 50 in one direction causes the nut 76 to move toward the head 52 of the bolt 50, thereby causing the cap 60 and the washers 70, 71, and 72, to compress the wall 44 of the compressible tube 40 longitudinally and forcing it to expand radially, which in turn causes the wall 14 of the housing 14 to expand radially outwardly. Turning the bolt 50 in an opposite direction causes the nut 76 to move away from the head 52, thereby causing the cap 60 and washers 70, 71, and 72 to decompress the compressible tube 40 (or allow the compressible tube to decompress), and thus relaxing the radial expansion of the wall 14 of the housing 12.

In alternative embodiments of the present disclosure, the bolt 50 and nut 76 combination is replaced by a simple cam mechanism (not shown).

In one example embodiment, the expandable housing 12 has an outer diameter of approximately 1.5 inches.

The present disclosure also includes a method of producing the joint stabilizer 10 described herein that includes assembling the housing 12, the compressible tube 40, the bolt 50, the cap 60, the washers 70, 71, and 72, the nut 76, and the pin 80. In various embodiments, the method includes: (1) inserting the tube 40 in the housing 12; (2) inserting the cap 60 in the first end of the housing 12; (3) inserting the bolt 50 through the cap 60, the housing 12, and the tube 40; (4) inserting the washers 70, 71, and 72 in the second end of the housing 12 and over the second end of the bolt 50; (5) inserting the pin 80 into the nut 76; and (6) inserting the nut 76 in the second end of the housing 12 and onto the bolt 50. It should be appreciated that the order of assembly may vary in accordance with the present disclosure.

The present disclosure also includes a method of stabilizing a loose joint between two adjacent concrete slabs (such as concrete slabs 90 and 96) utilizing the joint stabilizer 10 described herein. In various embodiments, the method includes: (1) drilling a cylindrical hole downward into the adjacent concrete slabs (such as concrete slabs 90 and 96), and centered on the plane of a lateral opening/joint at or between the adjacent concrete slabs; (2) positioning the joint stabilizer 10 in the cylindrical hole such that the outer surface 14a of the wall 14 of the housing 12 is adjacent to or in engagement with the respective inner walls of the adjacent concrete slabs that form the hole (such as shown in FIGS. 4A and 5 with respect to concrete slabs 90 and 96); and (3) turning the bolt 50 to cause the compression of the tube 40 and the radially outward expansion of the wall 14 of the housing 12 such the outer surface 14a of the wall 14 of the housing 12 is in sufficient frictional engagement with the respective inner walls of the adjacent concrete slabs that form the hole (such as shown in FIGS. 4A and 5 with respect to concrete slabs 90 and 96), thereby apply opposing horizontal forces to the adjacent concrete slabs (such as concrete slabs 90 and 96). The engagement between the expandable housing and the adjacent concrete slabs limits or prevents the adjacent concrete slabs from vertically moving relative to each other.

It should be appreciated that for U.S. Pat. No. 7,334,963, the expansion mechanism action on the housing can be thought of conceptually as including: (1) a housing; (2) a nut and bolt; and (3) wedge block ramps sliding along housing ramps, each oriented such that the expandable housings move away from each other. The resulting force of the wedge blocks is not uniform around the circumference of the housing. For the present disclosure, the expansion mechanism action on the expandable housing 12 can be thought of conceptually as including: (1) the housing 12; (2) a nut 76 and bolt 50 (although a simple cam could replace this); and (3) a cylindrical tube 40 of compressible material. For the present disclosure, the housing 12 is expanded more uniformly since the force generated by the bolt 50 and nut 76 tightening (or alternative cam rotation) on the cylindrical tube 40 of compressible material is distributed equally around the inner circumference of the housing 12. This more uniform distribution of forces provides a relatively lower ultimate force requirement and a relatively smaller diameter housing requirement.

It should be appreciated that joint stabilizer of the present disclosure can be used with varying sized holes between adjacent concrete slabs and may be made in various different sizes.

It should be appreciated that wall of the housing may be otherwise suitably shaped and formed to maximize engagement with the adjacent concrete slabs.

It should be appreciated from the above that in various embodiments, the present disclosure provides a concrete slab joint stabilizer comprising: an expandable housing including a wall defining a slit running along its longitudinal length, the expandable housing having a housing axis extending longitudinally there through; and an expander positionable in the expandable housing and configured to expand the expandable housing in directions perpendicular to the housing axis.

In various such embodiments, the expander is configured to expand the expandable housing uniformly in directions perpendicular to the housing axis.

In various such embodiments, the expander includes: a compressible tube; a bolt inserted through the compressible tube and having first and second end portions, the first end portion of the bolt having a head and the second end portion of the bolt being threaded; and a nut engagable with the threaded second end portion of the bolt.

In various such embodiments, turning the bolt in one direction causes the nut to move toward the head, thereby compressing the compressible tube longitudinally forcing it to expand radially, and turning the bolt in an opposite direction causes the nut to move away from the head, thereby uncompressing the compressible tube.

In various such embodiments, the compressible tube includes a rubber tube.

In various such embodiments, the rubber tube has a shore durometer hardness of 10 D or greater.

In various such embodiments, the rubber tube is treated.

In various such embodiments, the nut is rotatably fixed relative to the expandable housing, thereby preventing the nut to be rotated in the expandable housing while enabling the nut to slide longitudinally in the expandable housing.

In various such embodiments, the nut is rotatably fixed relative to the expandable housing via a pin connected to and extending transversely from the nut.

In various such embodiments, the expander includes at least one washer between the nut and the compressible tube.

In various such embodiments, the expander includes a cap configured to receive the head of the bolt and enable the bolt to rotate in the expandable housing.

In various such embodiments, the expandable housing has an outer diameter of approximately 1.5 inches.

In various such embodiments, the expander includes a compressible tube and a simple cam inserted through the compressible tube.

It should also be appreciated from the above that in various embodiments, the present disclosure provides a concrete slab joint stabilizer comprising: an expandable housing including a wall defining a slit running along its longitudinal length, the expandable housing having a longitudinal central opening and a housing axis extending longitudinally there through; and an expander configured to expand the expandable housing uniformly in directions perpendicular to the housing axis, the expander including: a compressible tube in the expandable housing, a cap partly in the expandable housing, a bolt positioned in the compressible tube, the bolt having a head and a threaded end portion connected to the head, a nut engagable with the threaded end portion of the bolt, the nut rotatably fixed relative to the expandable housing to prevent the nut from rotating in the expandable housing while enabling the nut to slide longitudinally in the expandable housing, a pin connected to and extending transversely from the nut to rotatably fix the nut relative in the expandable housing, and at least one washer between the nut and the compressible tube, wherein turning the bolt in one direction causes the nut to move toward the head of the bolt, thereby compressing the compressible tube longitudinally forcing it to expand radially, and wherein turning the bolt in an opposite direction causes the nut to move away from the head, thereby uncompressing the compressible tube.

In various such embodiments, the compressible tube includes a rubber tube.

In various such embodiments, the rubber tube has a shore durometer hardness of 10 D or greater.

In various such embodiments, the rubber tube is treated.

In various such embodiments, the expandable housing has an outer diameter of approximately 1.5 inches.

It will be understood that modifications and variations may be effected without departing from the scope of the novel concepts of the present invention, and it is understood that this application is to be limited only by the scope of the claims.

The invention is claimed as follows:

1. A concrete slab joint stabilizer comprising:
an expandable housing including a wall defining a slit running along its longitudinal length, the expandable housing having a housing axis extending longitudinally there through; and
an expander positionable in the expandable housing and configured to expand the expandable housing in directions perpendicular to the housing axis, the expander including:
a compressible tube;
a bolt inserted through the compressible tube and having first and second end portions, the first end portion of the bolt having a head and the second end portion of the bolt being threaded; and
a nut engagable with the threaded second end portion of the bolt.

2. The concrete slab joint stabilizer of claim 1, where the expander is configured to expand the expandable housing uniformly in directions perpendicular to the housing axis.

3. The concrete slab joint stabilizer of claim 1, wherein turning the bolt in one direction causes the nut to move toward the head, thereby compressing the compressible tube longitudinally forcing it to expand radially, and turning the bolt in an opposite direction causes the nut to move away from the head, thereby uncompressing the compressible tube.

4. The concrete slab joint stabilizer of claim 1, where the expander includes at least one washer between the nut and the compressible tube.

5. The concrete slab joint stabilizer of claim 1, wherein the expander includes a cap configured to receive the head of the bolt and enable the bolt to rotate in the expandable housing.

6. The concrete slab joint stabilizer of claim 1, wherein the expandable housing has an outer diameter of approximately 1.5 inches.

7. The concrete slab joint stabilizer of claim 1, wherein the compressible tube includes a rubber tube.

8. The concrete slab joint stabilizer of claim 7, wherein the rubber tube has a shore durometer hardness of 10 D or greater.

9. The concrete slab joint stabilizer of claim 7, wherein the rubber tube is treated.

10. The concrete slab joint stabilizer of claim 1, wherein the nut is rotatably fixed relative to the expandable housing, thereby preventing the nut to be rotated in the expandable housing while enabling the nut to slide longitudinally in the expandable housing.

11. The concrete slab joint stabilizer of claim 10, wherein the nut is rotatably fixed relative to the expandable housing via a pin connected to and extending transversely from the nut.

12. A concrete slab joint stabilizer comprising:
an expandable housing including a wall defining a slit running along its longitudinal length, the expandable housing having a longitudinal central opening and a housing axis extending longitudinally there through; and
an expander configured to expand the expandable housing uniformly in directions perpendicular to the housing axis, the expander including:
a compressible tube in the expandable housing,
a cap partly in the expandable housing,
a bolt positioned in the compressible tube, the bolt having a head and a threaded end portion connected to the head,
a nut engagable with the threaded end portion of the bolt, the nut rotatably fixed relative to the expandable housing to prevent the nut from rotating in the expandable housing while enabling the nut to slide longitudinally in the expandable housing,
a pin connected to and extending transversely from the nut to rotatably fix the nut relative in the expandable housing, and
at least one washer between the nut and the compressible tube,
wherein turning the bolt in one direction causes the nut to move toward the head of the bolt, thereby compressing the compressible tube longitudinally forcing it to expand radially, and
wherein turning the bolt in an opposite direction causes the nut to move away from the head, thereby uncompressing the compressible tube.

13. The concrete slab joint stabilizer of claim 12, wherein the compressible tube includes a rubber tube.

14. The concrete slab joint stabilizer of claim 13, wherein the rubber tube has a shore durometer hardness of 10 D or greater.

15. The concrete slab joint stabilizer of claim 13, wherein the rubber tube is treated.

16. The concrete slab joint stabilizer of claim 12, wherein the expandable housing has an outer diameter of approximately 1.5 inches.

17. A concrete slab joint stabilizer comprising:
an expandable housing including a wall defining a slit running along its longitudinal length, the expandable housing having a housing axis extending longitudinally there through, wherein the expandable housing has an outer diameter of approximately 1.5 inches; and
an expander comprising a compressible tube positionable in the expandable housing and configured to expand the expandable housing in directions perpendicular to the housing axis.

18. A concrete slab joint stabilizer comprising:
an expandable housing including a wall defining a slit running along its longitudinal length, the expandable housing having a housing axis extending longitudinally there through; and
an expander positionable in the expandable housing and configured to expand the expandable housing in directions perpendicular to the housing axis, the expander including a compressible tube and a simple cam inserted through the compressible tube.

19. A concrete slab joint stabilizer comprising:
an expandable housing having a housing axis extending longitudinally there through, the expandable housing including two longitudinally extending edges that are movable relative to each other when the expandable housing is expanded; and
an expander coupled to the expandable housing and configured to expand the expandable housing in directions perpendicular to the housing axis, the expander including:
a compressible tube positioned in the expandable housing and having a first end and a second end,
a first member positioned adjacent to the first end of the compressible tube, and
a second member positioned adjacent to the second end of the compressible tube, the first member and the second member configured to co-act on the compressible tube to cause the compressible tube to be compressed.

20. The concrete slab joint stabilizer of claim 19, where the expander is configured to expand the expandable housing uniformly in directions perpendicular to the housing axis.

21. The concrete slab joint stabilizer of claim 19, wherein the compressible tube includes a rubber tube.

22. The concrete slab joint stabilizer of claim 19, wherein the expander includes a third member extending through the compressible tube and coupled to the first member and the second member.

23. The concrete slab joint stabilizer of claim 19, wherein the second member is fixed to the expandable housing.

* * * * *